US010137971B2

(12) United States Patent
Andrasko et al.

(10) Patent No.: US 10,137,971 B2
(45) Date of Patent: *Nov. 27, 2018

(54) SYSTEMS AND METHODS FOR AUTOMATICALLY CONTROLLING ATTITUDE OF A MARINE VESSEL WITH TRIM DEVICES

(71) Applicant: Brunswick Corporation, Lake Forest, IL (US)

(72) Inventors: Steven J. Andrasko, Oshkosh, WI (US); Michael J. Lemancik, Oshkosh, WI (US); Steven M. Anschuetz, Oshkosh, WI (US); Andrew J. Przybyl, Berlin, WI (US); Daniel J. Balogh, Menasha, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,984

(22) Filed: Jun. 28, 2017

(65) Prior Publication Data

US 2017/0297668 A1 Oct. 19, 2017

Related U.S. Application Data

(63) Continuation of application No. 15/164,407, filed on May 25, 2016, now Pat. No. 9,745,036.
(Continued)

(51) Int. Cl.
*B63H 20/10* (2006.01)
*G05D 1/02* (2006.01)
*G05D 1/08* (2006.01)

(52) U.S. Cl.
CPC ........... *B63H 20/10* (2013.01); *G05D 1/0206* (2013.01); *G05D 1/0875* (2013.01)

(58) Field of Classification Search
CPC .......... B63H 5/08; B63H 20/10; B63H 20/12; B63H 20/14; B63H 20/20; B63H 20/00; B63H 21/21; G05D 1/02; G05D 1/0206
(Continued)

(56) References Cited

U.S. PATENT DOCUMENTS 3,682,127 A 8/1972 Waquet
3,777,694 A 12/1973 Best
(Continued)

FOREIGN PATENT DOCUMENTS

EP 2368791 1/2013

OTHER PUBLICATIONS

International Search Report and Written Opinion issued in corresponding International Application No. PCT/US2016/038360, dated Dec. 26, 2011.
(Continued)

*Primary Examiner* — Lars A Olson
(74) *Attorney, Agent, or Firm* — Andrus Intellectual Property Law, LLP

(57) ABSTRACT

A trim control system automatically controls trim angle of a marine propulsion device with respect to a vessel. A memory stores trim base profiles, each defining a unique relationship between vessel speed and trim angle. An input device allows selection of a base profile to specify an aggressiveness of trim angle versus vessel speed, and then optionally to further refine the aggressiveness. A controller then determines a setpoint trim angle based on a measured vessel speed. If the user has not chosen to refine the aggressiveness, the controller determines the setpoint trim angle from the selected base profile. However, if the user has chosen to refine the aggressiveness, the controller determines the setpoint trim angle from a trim sub-profile, which defines a variant of the relationship between vessel speed and trim angle defined by
(Continued)

the selected base profile. The control system positions the propulsion device at the setpoint trim angle.

20 Claims, 6 Drawing Sheets

Related U.S. Application Data

(60) Provisional application No. 62/183,392, filed on Jun. 23, 2015.

(58) Field of Classification Search
USPC .............................................. 440/1; 701/21
See application file for complete search history.

(56) References Cited

U.S. PATENT DOCUMENTS

| | | |
|---|---|---|
| 3,881,443 A | 5/1975 | Hamp |
| 3,999,502 A | 12/1976 | Mayer |
| 4,050,359 A | 9/1977 | Mayer |
| 4,310,320 A | 1/1982 | Pitchford |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |
| 4,605,375 A | 8/1986 | Ferguson |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,007,866 A | 4/1991 | Okita |
| 5,063,381 A | 11/1991 | Ito |
| 5,113,780 A | 5/1992 | Bennett et al. |
| 5,118,315 A | 6/1992 | Funami et al. |
| 5,142,473 A | 8/1992 | Davis |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,095,077 A | 8/2000 | DeAgro |
| 6,167,830 B1 | 1/2001 | Pilger |
| 6,273,771 B1 | 8/2001 | Buckley et al. |
| 6,287,160 B1 | 9/2001 | Onoue |
| 6,298,824 B1 | 10/2001 | Suhre |
| 6,322,404 B1 | 11/2001 | Magee et al. |
| 6,354,237 B1 | 3/2002 | Gaynor et al. |
| 6,458,003 B1 | 10/2002 | Krueger |
| 6,583,728 B1 | 6/2003 | Staerzl et al. |
| 6,733,350 B2 | 5/2004 | Lida et al. |
| 6,745,715 B1 | 6/2004 | Shen et al. |
| 6,923,136 B1 | 8/2005 | D'Alessandro |
| 6,994,046 B2 | 2/2006 | Kaji et al. |
| 6,997,763 B2 | 2/2006 | Kaji |
| 7,104,854 B2 | 9/2006 | Saito |
| 7,128,625 B2 | 10/2006 | Saito |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,381,108 B1 | 6/2008 | Salmon |
| 7,389,165 B2 | 6/2008 | Kaji |
| 7,416,456 B1 | 8/2008 | Gonring et al. |
| 7,462,082 B2 | 12/2008 | Kishibata et al. |
| 7,467,596 B2 | 12/2008 | Salmon |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,762,022 B1 | 6/2014 | Arbuckle et al. |
| 8,807,059 B1 | 8/2014 | Samples et al. |
| 8,840,439 B1 | 9/2014 | Wiatrowski et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,156,533 B2 | 10/2015 | Mueller |
| 9,278,740 B1 | 3/2016 | Andrasko et al. |
| 9,290,252 B1 | 3/2016 | Tuchscherer et al. |
| 9,359,057 B1 | 6/2016 | Andrasko et al. |
| 9,381,989 B1 | 7/2016 | Poirier |
| 9,463,858 B1 | 10/2016 | Remmers et al. |
| 9,517,825 B1 | 12/2016 | Anschuetz et al. |
| 9,745,036 B2 * | 8/2017 | Andrasko .............. B63H 20/10 |
| 9,862,471 B1 | 1/2018 | Taylor et al. |
| 9,896,174 B1 | 2/2018 | Anschuetz |
| 2002/0174818 A1 | 11/2002 | Von Wolske |
| 2003/0013359 A1 | 1/2003 | Suganuma et al. |
| 2003/0077953 A1 | 4/2003 | Kaji |
| 2004/0014376 A1 | 1/2004 | Noyes |
| 2004/0224577 A1 | 11/2004 | Kaji |
| 2005/0245147 A1 | 11/2005 | Takada et al. |
| 2007/0089660 A1 | 4/2007 | Bradley et al. |
| 2007/0093149 A1 | 4/2007 | Csoke |
| 2010/0114412 A1 | 5/2010 | Mizutani |
| 2011/0195816 A1 | 8/2011 | Martin |
| 2011/0263167 A1 | 10/2011 | Chiecchi |
| 2011/0281477 A1 | 11/2011 | Inoue et al. |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 | 3/2016 | Morvillo |

OTHER PUBLICATIONS

Andrasko et al., "Systems and Methods for Providing Notification Regarding Trim Angle of a Marine Propulsion Device", Unpublished U.S. Appl. No. 14/573,200, filed Dec. 17, 2014.

(56) References Cited

OTHER PUBLICATIONS

O'Brien et al., "Systems and Methods for Setting Engine Speed Relative to Operator Demand", Unpublished U.S. Appl. No. 14/684,952, filed Apr. 13, 2015.
Andrasko et al., "System and Methods for Automatically Controlling Attitude of a Marine Vessel with Trim Devices", Unpublished U.S. Appl. No. 14/873,803, filed Oct. 2, 2015.
Mercury Marine, 90-8M0081623 JPO Owners Manual—Auto Trim Portion, Section 2—On the Water, May 2013, p. 21.
Mercury Marine, 90-8M0076286 JPO Service Manual—Auto Trim Portion, Theory of Operation, Jul. 2013, p. 2A-5.
International Search Report and Written Opinion issued in corresponding International Application No. PCT/US2016/038360, dated Aug. 10, 2016.
Anschuetz et al., "System and Method for Trimmable Marine Devices with Respect to a Marine Vessel", Unpublished U.S. Appl. No. 15/003,335, filed Jan. 21, 2016.
Anschuetz et al., "System and Method for Trimming a Trimmable Marine Device with Respect to a Marine Vessel", Unpublished U.S. Appl. No. 15/003,326, filed Jan. 21, 2016.

\* cited by examiner

SYSTEMS AND METHODS FOR AUTOMATICALLY CONTROLLING ATTITUDE OF A MARINE VESSEL WITH TRIM DEVICES

CROSS REFERENCE TO RELATED APPLICATIONS

The present application is a continuation of U.S. application Ser. No. 15/164,407, filed May 25, 2016, which claims the benefit of U.S. Provisional Application Ser. No. 62/183,392, filed Jun. 23, 2015, and both of which disclosures are hereby incorporated by reference in their entirety.

FIELD

The present disclosure relates to systems and methods for controlling an attitude of a marine vessel.

BACKGROUND

Each of the below U.S. Patents and Applications is hereby incorporated herein by reference.

U.S. Pat. No. 4,776,818 discloses an electrical control system for trimming a pair of stern motors or drives mounted side-by-side on a boat. The two drives are both jointly and independently movable through a plurality of trim positions. The system includes two trim cylinders, each coupled to one associated drive, to move its associated drive to different trim positions both jointly as well as independently of each other. An operator controlled mechanism energizes and de-energizes the two trim cylinders simultaneously to jointly vary the trim position of the two drives. Two lines, each coupled at its first end to one associated drive, independently detect both the angular trim position of its associated drive with respect to the other drive as well as detects the trim position of the two drives jointly. Detection apparatus is coupled to the second end of each of the two lines and is responsive to the two lines when the two drives are not in the desired equal trim position with respect to each other for controlling switches to inactivate one of the trim cylinders and thereby moves the other of the trim cylinders with respect to the inactivated one trim cylinder until the desired equal trim position is achieved between the two drives.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 6,354,237 discloses a trim tab control system in which four buttons or switches are provided for the marine operator in which the operator can select to raise the bow, raise the stern, raise the port side of the boat, or raise the stern side of the boat in relative terms, and the system will automatically position the trim tabs to most efficiently achieve the operator's demanded change in position of the marine vessel.

U.S. Pat. No. 6,583,728 discloses a trim tab monitoring circuit which receives a signal that is representative of a voltage potential across a stator winding of a motor which is attached to the trim tab. This signal is passed through a high pass filter to remove the DC component of the signal, amplified, and passed through a low pass filter to remove certain high frequencies components of the signal. A zero crossing detector is used to discern individual pulses which are then received by a counter that provides a single output pulse for a predetermined number of input pulses. The series of output pulses from the counter are conditioned and, in conjunction with a direction sensor, provided to an up/down counter controller that provides digital signals to a signal output circuit. The signal output circuit provides a DC voltage output to a display and the DC output voltage is representative of the position of the trim tab.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820 discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

U.S. Pat. No. 9,278,740 discloses a system for controlling an attitude of a marine vessel having first and second trim tabs includes a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a trim control system automatically controls a trim angle of a trimmable marine propulsion device with respect to a marine vessel. The trim control system includes a memory that stores a plurality of trim base profiles, each base profile defining a unique relationship between a plurality of vessel speeds and respective trim angles of the propulsion device with respect to the marine vessel. A user interface including an input device allows a user to select one of the plurality of base profiles from the memory so as to specify an aggressiveness of trim angle relative to vessel speed, and thereafter to choose whether to further refine the specified aggressiveness. A controller thereafter determines a setpoint trim angle based on a measured vessel speed. If the user has not chosen to further refine the specified aggressiveness, the controller determines the setpoint trim angle from the selected base profile. However, if the user has chosen to further refine the specified aggressiveness, the controller determines the setpoint trim angle from a trim sub-profile, the sub-profile defining a variant of the unique relationship between the plurality of vessel speeds and respective trim angles defined by the selected base profile. The control system thereafter positions the propulsion device at the setpoint trim angle.

In another example of the present disclosure, a method for automatically controlling a trim angle of a trimmable marine propulsion device with respect to a marine vessel is provided. The method includes accepting a user selection of a trim sub-profile from a plurality of trim sub-profiles, each sub-profile defining a variant of a relationship between a plurality of vessel speeds and respective trim angles of the propulsion device with respect to the marine vessel. The method further includes measuring a speed of the marine vessel, and with a controller, determining a setpoint trim angle that corresponds to the measured vessel speed according to the selected sub-profile. The method also includes sending a control signal to position the propulsion device at the setpoint trim angle.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for automatically controlling trim positions of trimmable propulsion devices on a marine vessel by controlling one or more trim actuators that couple the trimmable propulsion devices to the transom of the marine vessel. In one example, each trim actuator is a hydraulic piston-cylinder in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of such trim actuators can be used to rotate trimmable propulsion devices, such as but not limited to outboard motors or the outboard portions of sterndrives or pod drives, up and down with respect to a marine vessel to which they are coupled.

Those skilled in the art of marine vessel propulsion and control are familiar with many different ways in which the trim angle of a propulsion device can be varied to change the handling or feel of the vessel. For example, many manual trim control systems are known to those skilled in the art. In typical operation, the operator of a marine vessel can change the trim angle of an associated propulsion device as the velocity of the vessel changes. This is done to maintain an appropriate angle of the vessel with respect to the water as it accelerates, achieves a planing speed, and as it increases its velocity over the water while on plane. The operator inputs a command to change the trim angle for example by using a keypad, button, or similar input device with "trim up" and "trim down" input choices. The operator can select these input choices to trim the propulsion device up or down until a desired handling or feel of the vessel over the water is achieved.

The systems of the present disclosure are also capable of carrying out automatic trim (auto-trim) methods, in which the propulsion device is automatically trimmed up or down with respect to its current position, depending on a desired attitude of the marine vessel with respect to vessel speed. Auto-trim systems perform the trim operation automatically, as a function of vessel speed, without requiring intervention by the operator of the marine vessel. The automatic change in trim angle of the propulsion device enhances the operation of the marine vessel as it accelerates, achieves planing speed, and further increases its velocity over the water while on plane.

Figure 1:
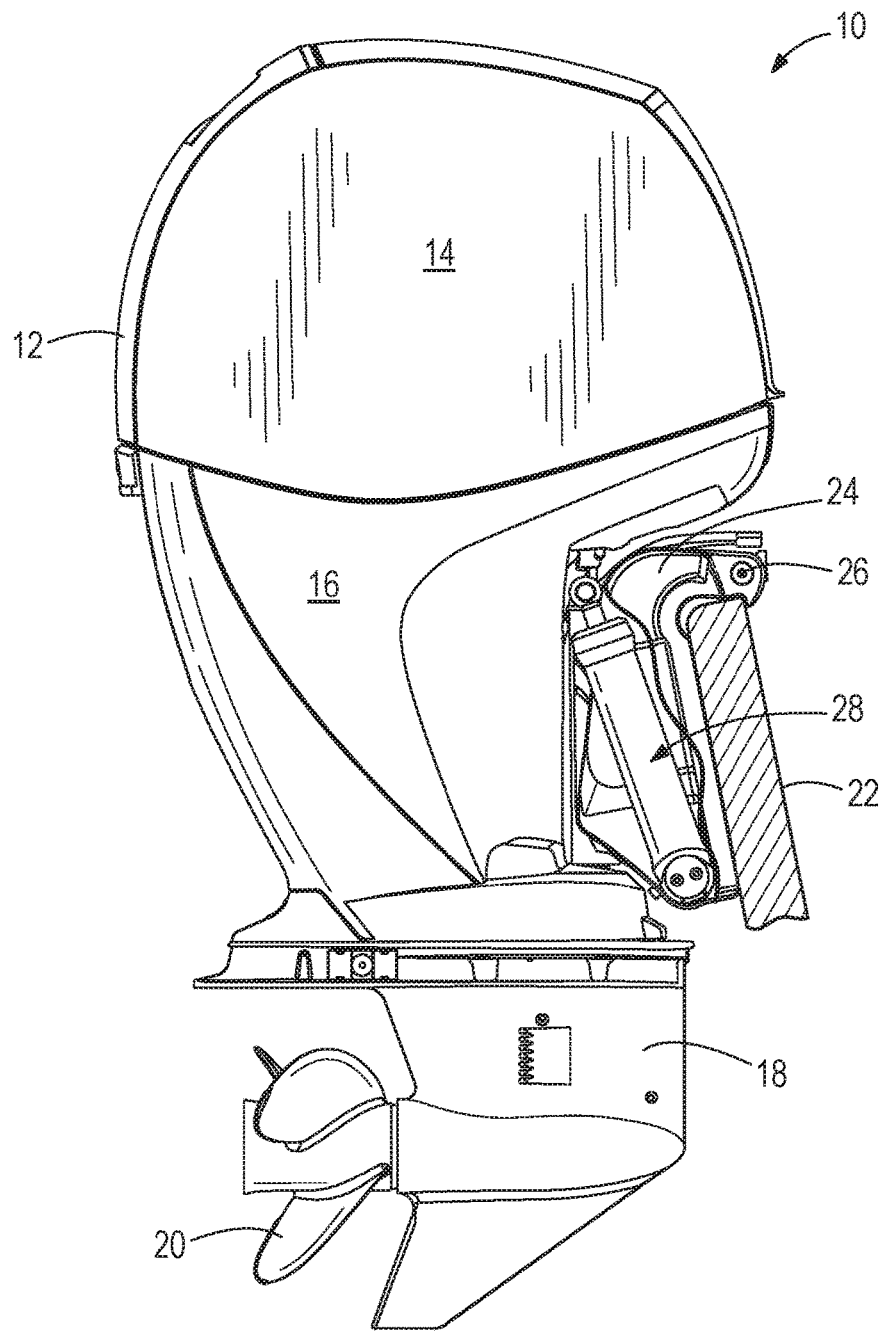
FIG. 1 illustrates one example of a marine propulsion device according to the present disclosure.

FIG. 1 illustrates ones example of a trimmable marine propulsion device 10, which in this example is an outboard motor 12. In other examples, the propulsion device 10 could be a trimmable sterndrive or trimmable pod drive. The outboard motor 12 includes a powerhead section 14 connected via a midsection 16 to a lower unit 18, including a propeller 20 that provides propulsive force as it rotates through water. In other examples, the propulsion device 10 includes an impeller or a jet pump for providing propulsive force. The outboard motor 12 is coupled to a transom 22 of a marine vessel 30 (see FIGS. 2-4) by way of a mounting bracket 24. The outboard motor 12 is rotatable up and down with respect to the vessel about a tilt/trim axis 26 by way of extension and retraction of a trim actuator 28. As mentioned above, the trim actuator 28 can be a hydraulic, pneumatic, or electric device.

Figure 2:
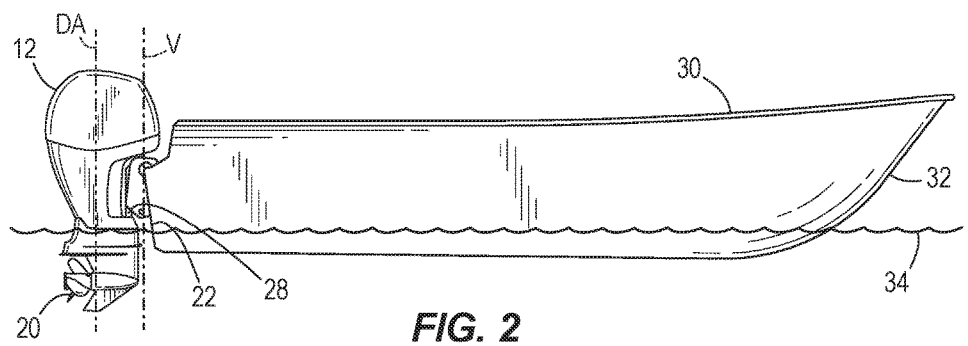
FIGS. 2-4 illustrate a marine vessel having a marine propulsion device coupled to its transom, wherein the marine propulsion device is positioned at different trim angles with respect to the marine vessel.
Figure 3:
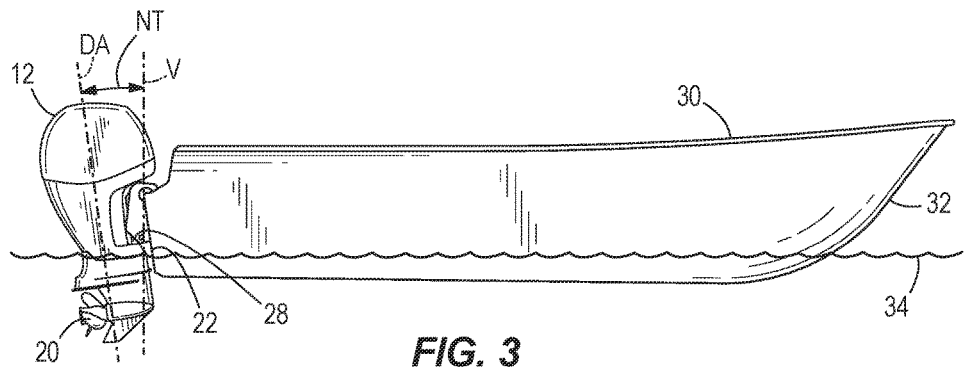
Figure 4:
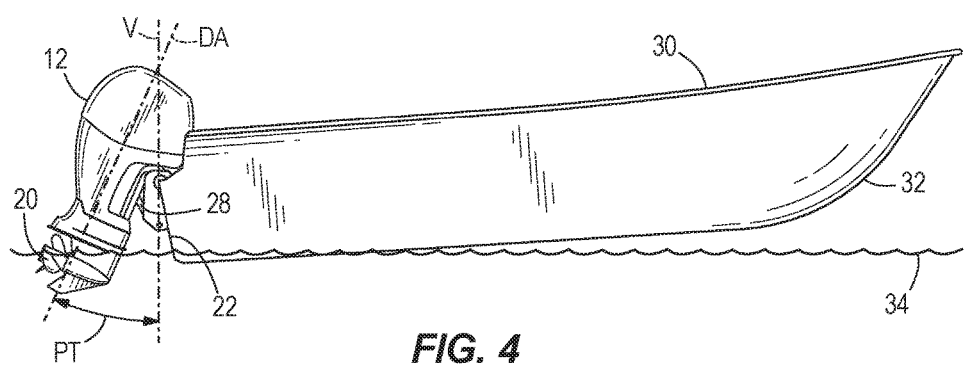

FIGS. 2-4 illustrate one example of a marine vessel 30 having a system for controlling an attitude of the marine vessel 30. In this example, the marine vessel 30 is equipped with one or more outboard motors 12 on its transom 22. The outboard motor(s) 12 can be trimmed to different angles with respect to the transom 22 via the trim actuator 28 as known to those having ordinary skill in the art. In FIG. 2, the outboard motor 12 is shown in a neutral (level) trim position, in which the outboard motor 12 is in more or less of a vertical position. This can be seen by comparing driveshaft axis DA of the outboard motor 12 with vertical line V. In FIG. 3, the outboard motor 12 is shown in a trimmed in (trimmed down) position In other words, the lines DA and V will intersect below where the outboard motor 12 is connected to the transom 22. In FIG. 4, the outboard motor 12 is shown in a trimmed out (trimmed up) position. The lines DA and V will intersect above the outboard motor's connection point to the transom 22. The positions in FIGS. 2 and 3 are generally used when the marine vessel 30 is operating at slower speeds. For example, the trim position shown in FIG. 2 is often used when the marine vessel 30 is in a joysticking mode. The trim position in FIG. 3 is often used during launch of the marine vessel 30, before the marine vessel has gotten up to speed and on plane. In contrast, the trim position shown in FIG. 4 is often used when the marine vessel 30 is on plane and high speeds are required. At high speeds, the trim position shown in FIG. 4 causes the bow 32 of the marine vessel 30 to rise out of the water 34 as shown.

Figure 5:
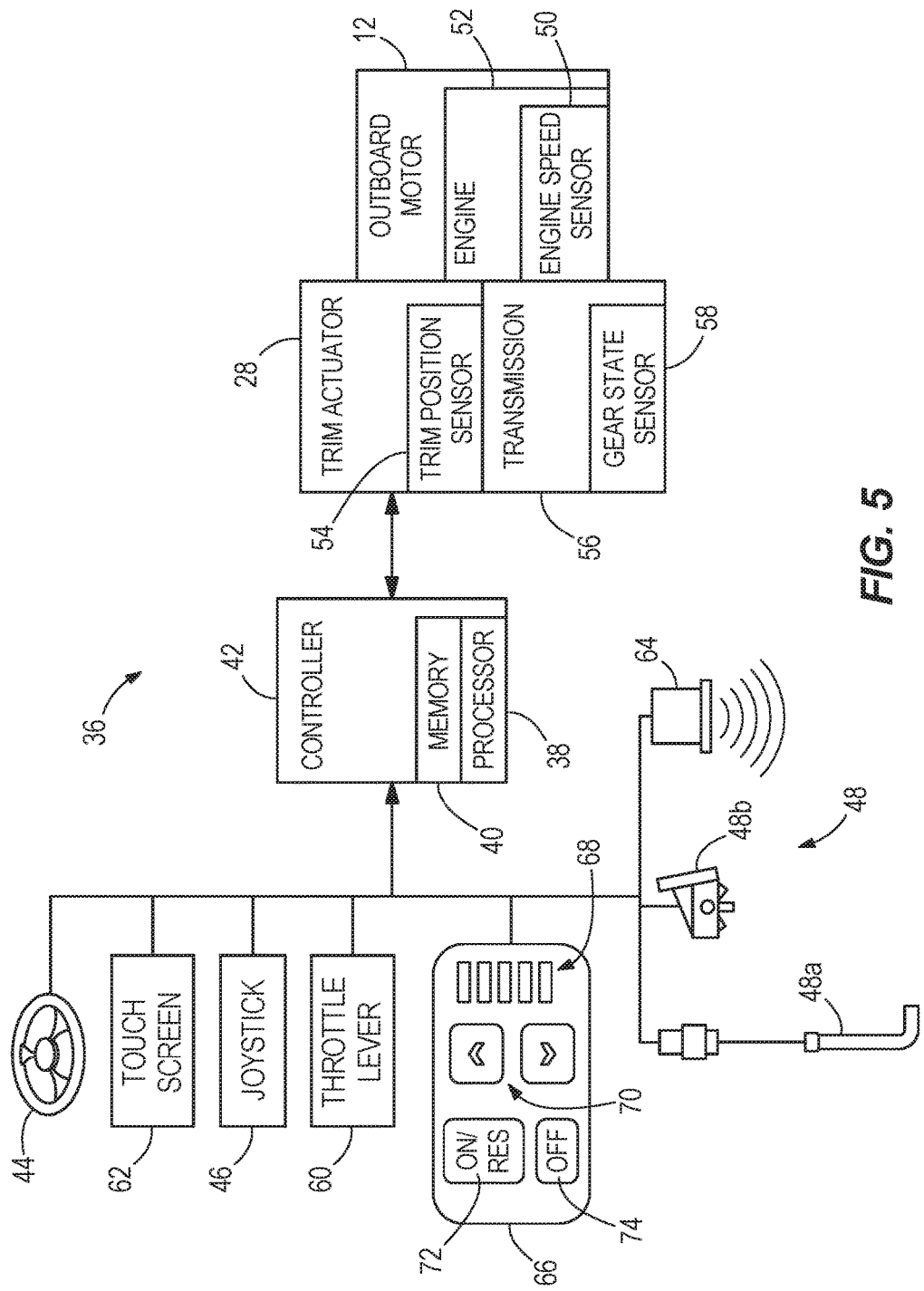
FIG. 5 illustrates one example of a control system for controlling a position of a trimmable propulsion device with respect to a marine vessel.

FIG. 5 shows an example trim control system 36 for use with the outboard motor 12 and marine vessel 30 of FIGS. 1-4, which carries out the methods described herein below. Although the specific connections of the devices in the control system 36 shown may more closely resemble those for a marine vessel equipped with an outboard motor or stern drive, it should be understood that the same principles apply to a vessel equipped with trim tabs. In one example, the software that when executed by a processor 38 carries out the methods of the present disclosure can be loaded in a memory 40 of a controller 42, such as an engine control unit, a trim control unit, a helm control unit, etc. However, it should be understood that a separate module could be provided for carrying out the methods described herein or that the methods described herein could be carried out by any combination of the above-described control units.

The controller 42 receives inputs from several different sensors and/or input devices aboard the marine vessel. For example, the controller 42 receives a steering input from a steering wheel 44 and/or joystick 46. The controller 42 is also provided with an input from a vessel speed sensor 48. The vessel speed sensor 48 may be, for example, a pitot tube sensor 48a, paddle wheel type sensor 48b, or any other speed sensor appropriate for sensing the actual speed of the marine vessel. The vessel speed may instead be obtained by taking readings from a GPS device (not shown), which calculates speed by determining how far the vessel has traveled in a given amount of time. The outboard motor 12 is provided with an engine speed sensor 50 such as a tachometer that determines a speed of an engine 52 powering the outboard motor 12 in rotations per minute (RPM). This reading could be used, along with other data, to determine a pseudo vessel speed. A trim position sensor 54 is also provided for sensing an actual position of the trim actuator 28, for example, an amount of extension of a hydraulic cylinder, which corresponds to the trim angle of the propulsion device. The trim position sensor 54 may be any type of sensor known to those having ordinary skill in the art. A transmission 56 and a gear state sensor 58 can also be provided.

Other inputs can come from operator input devices such as a throttle lever 60, a touchscreen 62, and a keypad 66. The throttle lever 60 allows the operator of the marine vessel 30 to choose to operate the vessel in neutral, forward, or reverse, as is known. The touchscreen 62 or the keypad 66 can be used to initiate or exit any number of control or operation modes (such as auto-trim mode) as will be described further herein below, or to make selections while operating within one of the selected modes. The touchscreen 62 can also display operational characteristics to the operator of the vessel. A water depth sensor 64 such as a sonar is also provided.

Existing implementations of automatic trim (auto-trim) control systems and methods either require a configuration via a multi-function display, or merely have one preset profile of trim angle versus engine RPM. This does not offer the fidelity of control or flexibility that operators expect or that the marine vessel requires for different conditions, such as weather and/or loading. Nor does this offer flexibility based on a particular type of boat or marine propulsion device. The present inventors have realized that it would be desirable to read an engine type over a controller area network (CAN) in order to automatically differentiate between a sterndrive and an outboard, and to determine the type of sterndrive or outboard. A user interface would then allow a user to choose a specific trim profile (vessel speed vs. trim angle) that is appropriate for that type of propulsion device, considering the vessel that it is propelling. The profiles would offer the user the ability to select the best fit for the current loading and/or weather conditions. These profiles could be defined by calibrated tables or curves, or a nominal profile can be calibrated and thereafter modified by use of equations and/or gains. The user interface could also be provided with on/off/resume functionality along with this ability to select trim profiles.

Figure 6:
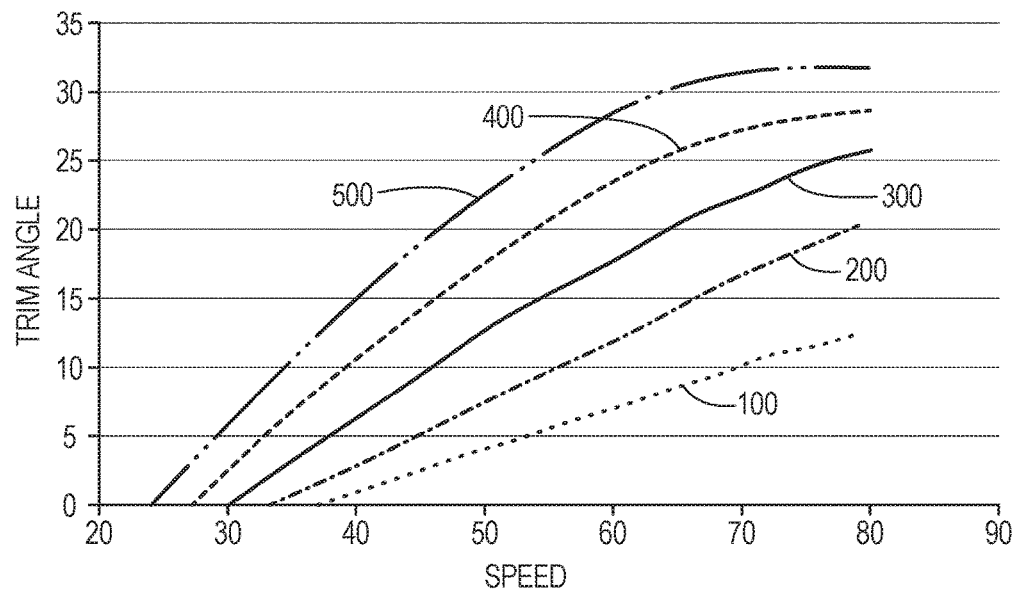
FIG. 6 illustrates a plurality of trim base profiles that can be selected for determining a setpoint trim angle of a trimmable marine propulsion device.

A trim control system 36 for allowing selection of a trim profile comprises a memory 40 that stores a plurality of trim base profiles 100, 200, 300, 400, 500. FIG. 6 shows one example of what the base profiles might look like. As shown, each base profile defines a unique relationship between a plurality of vessel speeds and respective trim angles of the propulsion device 10 with respect to the marine vessel 30. For example, the plurality of vessel speeds are shown on the X-axis in kilometers per hour and the associated trim angles are shown as percentages of total allowed trim along the Y-axis. In other examples, the vessel speeds could be in miles per hour and the trim values could be angles. The base profiles shown in FIG. 6 were developed by determining optimal trim angles for a particular propulsion device powering a particular marine vessel at a number of tested vessel speeds. For example, vessels as varied as bass boats, walleye boats, pontoons, and racing boats may be tested with a variety of different engines appropriate for those types of boats, under different loading conditions, in rough and calm water, and with different propellers. The optimal on-plane trim angles for each vessel/engine/condition combination can be plotted with respect to the vessel speeds. The various data points on this plot can be used to find best-fit lines that define unique base profiles for different types of engine/boat combinations.

Alternatively, the unique relationship defined by each base profile can be developed by modifying a nominal relationship between a number of vessel speeds and a number of corresponding trim angles. The nominal relationship can be a calibrated relationship developed by determining optimal trim angles for a particular marine propulsion device powering a particular marine vessel at a number of tested vessel speeds. For example, one marine vessel/propulsion device combination can be tested, and a third or fourth order equation or other types of gains can be used in order to approximate the remaining base profiles.

Although the trim profiles are shown herein as being graphical, base profiles defining optimal trim angles for different vessel/engine combinations could also be stored in lookup tables, charts, or similar input-output maps. Additionally, it should be noted that a trim angle is considered optimal at a given vessel speed if it prevents porpoising, situates the vessel at a good height and attitude in the water (i.e. raises the bow) while the vessel is on-plane, and results in good fuel efficiency. Additional factors can of course be included to determine whether a trim angle is considered to be optimal.

Profile 5, shown at 500 in the upper left of FIG. 6, is the most aggressive trim profile, where a change in trim percent per change in vessel speed, especially at the lower end of the speed range, is relatively higher than in Profile 4 (at 400), Profile 3 (at 300), Profile 2 (at 200) or Profile 1 (at 100). Additionally, a system using Profile 5 will begin to trim at a lower vessel speed (about 24 KPH) than a system using one of the other profiles. For example, Profile 3 shows that the propulsion device will begin to trim at about 30 KPH. The type of profile represented by Profiles 5 (at 500) or 4 (at 400) could be used for a small aluminum walleye boat or a pontoon boat. For example, a pontoon boat may respond best when trimming according to Profile 5 because it is generally a slower application, and rarely does it exceed 50 MPH, unless it is a higher-end multi-engine pontoon. Therefore, in order to get any reaction from the trim system, a Profile 5 is needed to cause the boat to trim at lower speeds. Profile 5 or Profile 4 will also work well for a shorter, faster stern drive application. In contrast, Profile 1 (at 100) or Profile 2 (at 200), toward the lower right hand corner of the chart, could be used for a higher-speed boat, such as a bass boat, a racing boat, or an offshore multi-engine application. These types of boats are generally longer and lighter up in the bow, and trimming at lower speeds can result in porpoising or prop venting. Therefore, better results are obtained by using a Profile 1 or 2, where the system doesn't start trimming until the vessel's speed is higher. The remaining Profile 3 (at 300) might work best for vessel/engine combinations between the above-described general trends.

A base profile can either be selected by the operator of the marine vessel himself, or it could be selected during a key-up test or install by a technician who knows the appropriate trim profile for that vessel/engine combination. Typically, only one or two profiles will work well for any given vessel/engine combination, and the technician will be experienced enough to know which profile is appropriate. In order to allow selection of the base profile, the system therefore includes a user interface including an input device that allows a user to select one of the plurality of base profiles from the memory so as to specify an aggressiveness of trim angle relative to vessel speed. In one example, the user interface is the keypad 66 shown in FIG. 5. The example in which the user interface is the keypad 66 will be used throughout the remainder of the present description; however, in another example, the user interface could be the touch screen 62, which would provide similar functionality and options.

In one example, the controller 42 may receive a signal indicating whether the propulsion device 10 that is propelling the marine vessel 30 on which the controller 42 is installed is a stern drive or an outboard drive. The controller 42 may thereafter access the memory 40 to retrieve a set of stern drive base profiles or a set of outboard base profiles, as appropriate, prior to allowing the user to select one of the plurality of base profiles via the user interface and user input device. In other examples, the same base profiles could be used for both stern drives and outboard drives. However, providing selection between two different sets of calibrated base profiles allows the base profiles to better conform to the conditions most likely to be encountered while driving the marine vessel with that type of propulsion device.

Figure 7:
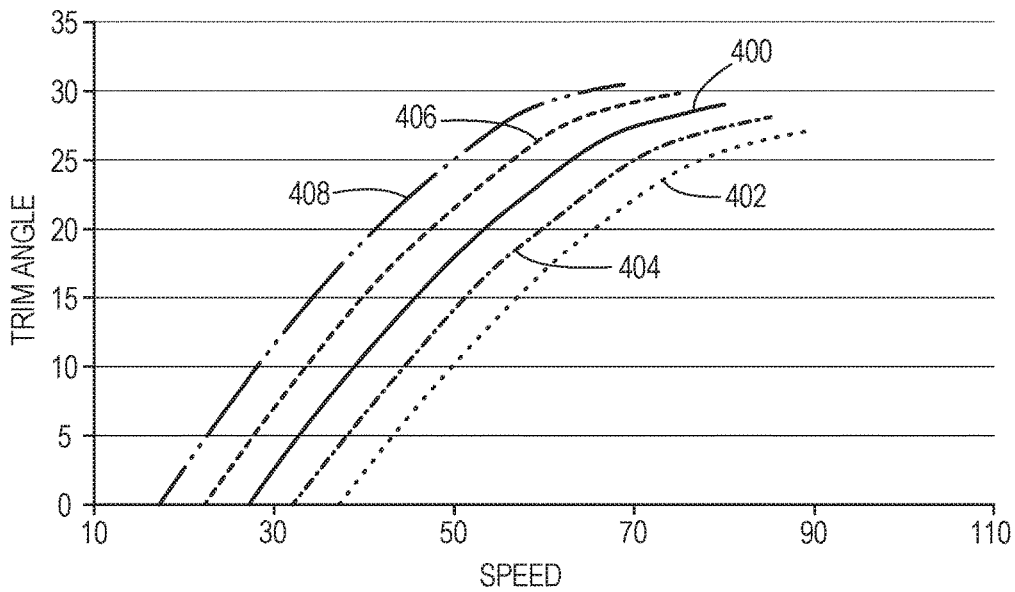
FIGS. 7-9 illustrate a plurality of trim sub-profiles that can be selected for determining a setpoint trim angle of a trimmable marine propulsion device.
Figure 8:
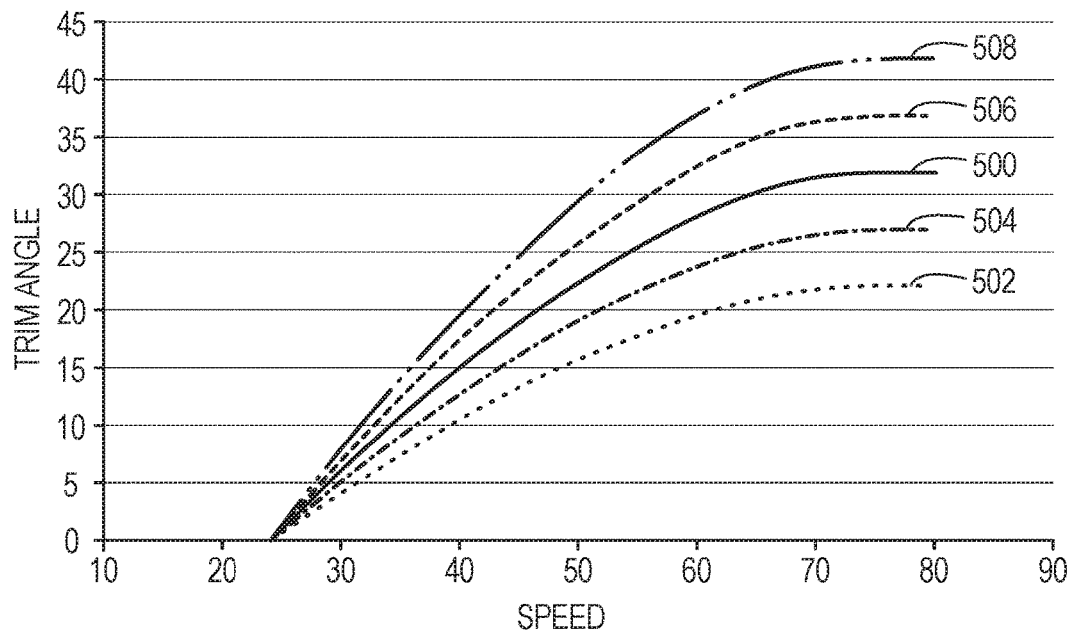
Figure 9:
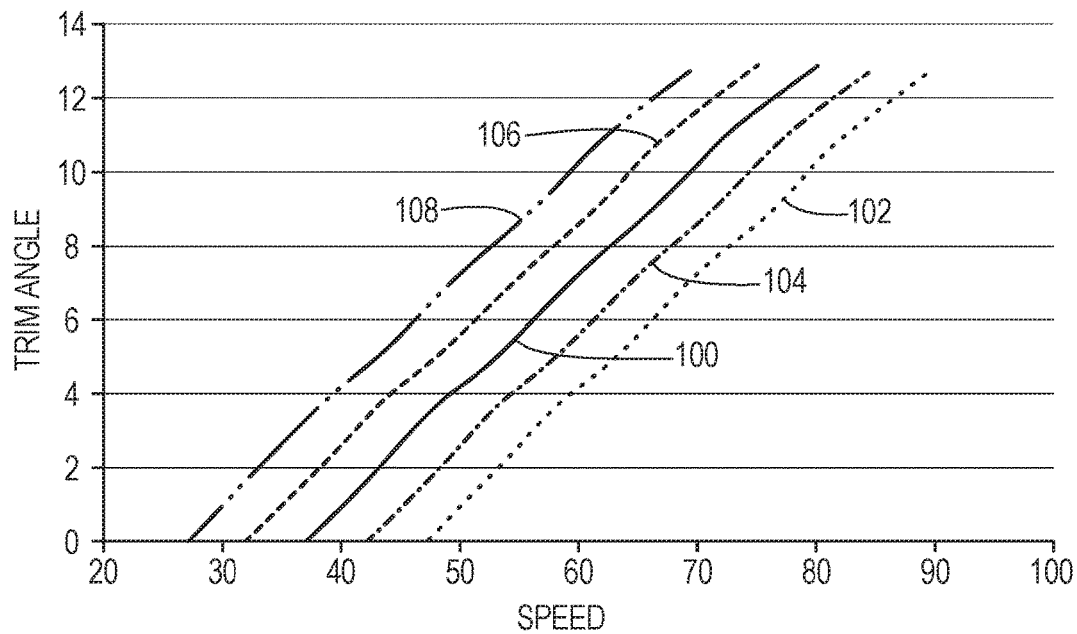

As will be described further herein below, once the user has selected a base profile, the user interface thereafter allows the user to choose whether to further refine the specified aggressiveness of trim angle relative to vessel speed. The controller 42 thereafter determines a setpoint trim angle for the propulsion device based on a measured vessel speed, for example determined by one of the vessel speed sensors 48. If the user has not chosen to further refine the specified aggressiveness, the controller 42 determines the setpoint trim angle from the selected base profile 100, 200, 300, 400, or 500. On the other hand, if the user has chosen to further refine the specified aggressiveness, the controller 42 determines the setpoint trim angle from a trim sub-profile, examples of which are shown in FIG. 7-9, the sub-profile defining a variant of the unique relationship between the plurality of vessel speeds and respective trim angles defined by the selected base profile 100, 200, 300, 400, or 500. The control system 36 thereafter positions the propulsion device 10 at the setpoint trim angle.

As mentioned, the user interface and the input device allow the user to select from a plurality of trim sub-profiles in order to further refine the specified aggressiveness. Each sub-profile defines a distinct variant of the unique relationship between the plurality of vessel speeds and respective trim angles defined by the selected base profile. It should be noted that the sub-profiles can be pre-saved in the memory 40 or could instead be auto-generated upon selection of a particular base profile. In other words, in the latter instance, the trim angle for a given vessel speed could be calculated from the base profile on-the-fly. In any case, the selected base profile then becomes the new nominal profile and the sub-profiles are generated off the selected base profile by scaling the selected base profile by a multiplier and/or shifting the selected base profile by an offset.

In one example, the sub-profiles are multiples of the selected base profile and relate each vessel speed in the plurality of vessel speeds to a multiple of its respective setpoint trim angle from the selected base profile. Depending on the multiple by which the base profile is scaled, the sub-profile will provide a greater change in trim angle per change in vessel speed or a lesser change in trim angle per change in vessel speed than that provided by the base profile. This allows the trim position/angle to accommodate a vessel that gets on plane faster or slower due to environmental conditions than it normally would. In another example, the sub-profiles are profiles that are shifted from the selected base profile by a speed offset. This can allow the propulsion device to begin trimming sooner or later than it would if it were following the selected base profile. (Note that according to most auto-trim algorithms, generally the propulsion device 10 will not begin auto-trimming up/out until the vessel 30 has gained some speed, and is therefore likely very close to being—or already is—on plane.)

Additionally, depending on the speed offset and/or multiplier, there may be a lesser difference between a setpoint trim angle in a first sub-profile and a neighboring second sub-profile than there is between a setpoint trim angle in a first base profile and a neighboring second base profile for the same given vessel speed. For example, compare the relatively smaller increase in trim at 50 KPH between Profile 1 shown at 502 and Profile 2 shown at 504 in FIG. 8 versus the larger increase in trim at 50 KPH between Profile 1 at 100 and Profile 2 at 200 in FIG. 6. In other words, the sub-profiles can provide finer resolution around the new nominal profile, i.e. the previously-selected base profile. Providing this finer resolution prevents the operator from being able to select an "incorrect" sub-profile for the vessel. Both of the above examples and more will be described with respect to FIGS. 7-9.

As described above, the trim sub-profiles can be multiples of and/or offset from the base profile. Therefore, the plurality of sub-profiles for each base profile includes a first sub-profile in which each vessel speed in the plurality of vessel speeds corresponds to a respective trim angle that is less than it would be for a same vessel speed in the selected base profile. For example, FIG. 7 shows an instance in which sub-profiles are created off of base profile 400 (FIG. 6). As noted, base profile 400 becomes the new nominal profile (Profile 3). As shown in FIG. 7, both sub-profiles 402 and 404 provide trim angles that are less than they would be for same vessel speed in the selected base profile 400. The plurality of sub-profiles also includes a second sub-profile in which each vessel speed in the plurality of vessel speeds corresponds to a respective trim angle that is greater than it would be for the same vessel speed in the selected base profile. Again referring to FIG. 7 as an example, both sub-profiles 406 and 408 return trim angles that are greater than the trim angle would otherwise be in the selected base profile 400 given the same vessel speed. A similar pattern can be seen in FIG. 8, where sub-profiles 502 and 504 return trim angles that are less than that of base profile 500 for a given vessel speed, and sub-profiles 506 and 508 return trim angles that are greater than that of base profile 500 for a given vessel speed. A similar pattern can also be seen in FIG. 9, where sub-profiles 102 and 104 return trim angles that are less than that of base profile 100 for a given vessel speed, and sub-profiles 106 and 108 return trim angles that are greater than that of base profile 100 for a given vessel speed.

FIG. 8 shows an example of how the base profile can be scaled by a multiplier in order to vary the change in trim angle versus change in vessel speed. In one example, a change in trim angle relative to change in vessel speed is less in a given sub-profile than in the selected base profile. For example, the change in trim angle relative to change in vessel speed is less for sub-profile 504 than it is for base profile 500. The change in trim angle per change in vessel speed is less for sub-profile 502 than it is for sub-profile 504, and is also less than it is for base profile 500. In other words, the "slope" of the base profile 500 is scaled by a multiplier that is less than one in order to return a lesser change in trim angle relative to change in vessel speed. In contrast, the change in trim angle relative to change in vessel speed can be greater in a given sub-profile than in the selected base profile. For example, the change in trim angle relative to change in vessel speed is greater for sub-profile 506 than it is for base profile 500. The change in trim angle relative to change in vessel speed for sub-profile 508 is greater than it is for sub-profile 506, and also greater than it is for base profile 500. In other words, the "slope" of the base profile 500 is scaled up by a multiplier that is greater than one.

Turning to FIG. 9, an example of a how the base profile can be varied using a speed offset, which shifts the speed versus trim angle profile to the right or left, will be described. As shown in FIG. 9, a vessel speed at which the respective trim angle first becomes non-zero is greater in a given sub-profile (either sub-profile 102 or sub-profile 104) than in the selected base profile 100. For example, the vessel speed at which the trim angle first becomes non-zero in sub-profile 102 is around 47 KPH, while the vessel speed at which the trim angle first becomes non-zero in base profile 100 is around 37 KPH. In contrast, the vessel speed at which the respective trim angle first becomes non-zero can be less in a given sub-profile than in the selected base profile 100. For example, see sub-profile 106, at which the vessel speed first becomes non-zero at about 32 KPH or sub-profile 108, at which the vessel speed first becomes non-zero at about 27 KPH.

FIG. 7 shows an example in which base profile 400 has both been scaled by a multiplier and shifted with a speed offset. Thus, it can be seen that both sub-profiles 402 and 404 have a change in trim angle per change in vessel speed that is slightly less than that of base profile 400, and that both sub-profiles 402 and 404 have trim angles which first become non-zero at vessel speeds that are greater than the vessel speed at which the trim angle first becomes non-zero according to base profile 400. Additionally, it can be seen that both sub-profiles 406 and 408 have a change in trim angle per change in vessel speed that is slightly greater than that of base profile 400, and both sub-profiles 406 and 408 have trim angles which first become non-zero at vessel speeds that are less than the vessel speed at which the trim angle first becomes non-zero according to base profile 400.

FIG. 8 shows an instance in which no speed offset is included, and the sub-profiles 502, 504, 506, 508, and base profile 500 each begin trimming at the same vessel speed of about 24 KPH. FIG. 9, in contrast, shows an instance in which there is no scaling of the base profile, and the change in trim angle per change in vessel speed is the same for sub-profiles 102, 104, 106, and 108 as it is for base profile 100. It should be noted that the sample base profiles 400, 500, and 100 used to create the charts of FIGS. 7 through 9 are used merely as examples. Any of the base profiles 100, 200, 300, 400, or 500 can be used to create sub-profiles that are both scaled by a multiplier and shifted by a speed offset, shifted by a speed offset only, or scaled by a multiplier only. Additionally, the amount of the speed offset and the multipliers by which the base profiles are varied need not be as shown in the above examples, which have been exaggerated to show the effects of shifting and scaling. Larger or smaller offsets and/or multipliers could be used. The amount of offset by which a base profile will be shifted and the multiplier by which a base profile will be scaled can be calibrated, or can be user-selected values chosen via the user interface.

The base profiles shown in FIG. 6 need not be the only possible base profiles. Fewer or more than five base profiles could be provided. Additionally, the sub-profiles need not be limited to a number of four.

Returning to FIG. 5, as mentioned above, the keypad 66 is one example of the user interface. In this example, the user interface includes a display (here, a series of LEDs or lights 68) that shows the user whether the controller 42 is using the selected base profile or one of the plurality of sub-profiles to determine the setpoint trim angle of the propulsion device 10. For example, the bottom light in the plurality of lights 68 could be lit up to show that the user is using the lowest sub-profile (Profile 1); the bottom two lights could be lit to show that the user is using the second lowest sub-profile (Profile 2); the bottom three lights could be lit to show that the user is using the base profile (Profile 3); the bottom four lights could be lit to show that the user is using the second highest sub-profile (Profile 4); or all five lights could be lit to show that the user is using the highest sub-profile (Profile 5). The user could select between each of the sub-profiles and nominal base profile using up and down buttons 70. These would allow the user to scroll through the nominal base profile and sub-profiles in order to determine which profile provides the best response of the marine vessel given existing wind, water, and/or loading conditions. An on/resume button 72 can be provided in order to initiate the auto-trim function, complete with the ability to select from the base and sub-profiles. An off button 74 could be used to allow the user to exit the auto-trim mode and instead to trim manually using the up and down buttons 70 or another set of buttons provided elsewhere.

As described herein above, either the technician calibrating the controller 42 aboard a specific marine vessel or an operator of the marine vessel can be the one to select between the base profiles and/or sub-profiles. For example, the first time the auto-trim system is started up, it may be in a configuration mode. The lights 68 on the keypad 66 may be blinking in a random fashion to indicate that the configuration mode is active. At this time, all five preset base profiles are available for selection by the user. A base profile that is appropriate for a particular model vessel and propulsion device can be selected using the up and down buttons 70. For instance, the first base profile 100 may correspond to the bottom light 68 being lit, while the fifth base profile 500 may correspond all five lights 68 being lit, and so forth for base profiles 200, 300, and 400. The user may press both the up and down buttons 70 simultaneously for a given number of seconds in order to save the selected base profile.

After the selected base profile has been saved, the base profile will become the new nominal third profile (see FIGS. 7-9). The lights 68 will discontinue flashing. Profiles 1, 2, 4, and 5 are now sub-profiles that can be selected by the user. As mentioned above, the sub-profiles may be shifted by a speed offset to begin trimming at different vessel speeds than the base profile or may be scaled by a multiplier to provide greater or less "slope" to the base profile. The user can then use the up and down buttons 70 to select the desired sub-profile or new nominal base profile depending on conditions such as wind, waves, and/or loading. If any of these types of conditions change, the user can select a different sub-profile that provides a better trim response for the new conditions. If the user later desires to change the base profile (e.g. from a base Profile 3 to a base Profile 4), the user can re-enter the configuration mode by simultaneously holding on the up and down buttons 70 for a given period of time.

Figure 10:
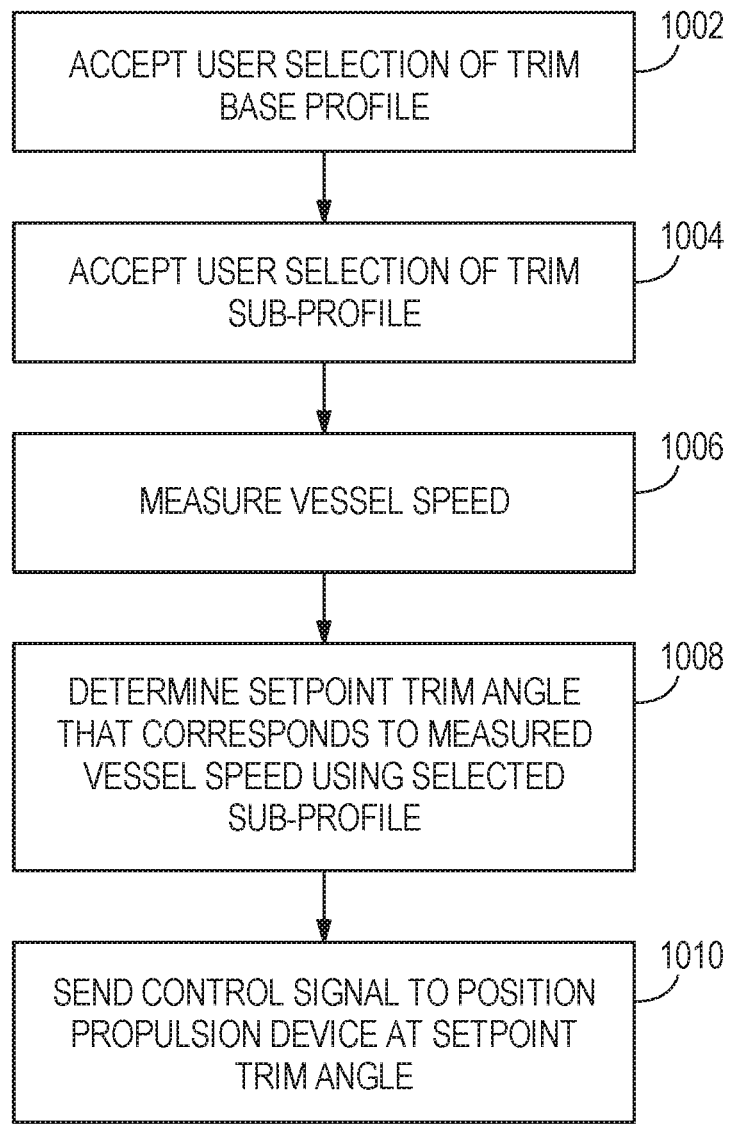
FIG. 10 illustrates one example of a method for automatically controlling a trim angle of a trimmable marine propulsion device according to the present disclosure.

Now turning to FIG. 10, a method for automatically controlling a trim angle of a trimmable propulsion device 10 with respect to a marine vessel 30 will be described. As shown at 1002, the method includes accepting a user selection of a trim base profile from a plurality of trim base profiles. Each base profile in the plurality of base profiles may define a unique relationship between a plurality of vessel speeds and respective trim angles of which a given sub-profile is a variant. The unique relationship defined by each base profile may be developed by modifying a nominal relationship between a number of vessel speeds and a number of corresponding trim angles. Alternatively, the unique relationship defined by each base profile may be a calibrated relationship developed by determining optimal trim angles for a particular propulsion device powering a particular marine vessel at a number of tested vessel speeds. Additionally, as described herein above, the method may further include receiving a signal indicating the propulsion device 10 is a stern drive or an outboard drive and thereafter retrieving a set of stern drive base profiles or a set of outboard drive base profiles, as appropriate, from which the user selection of the base profile can be made.

Step 1002 of the method is optional, and the method could instead begin at 1004, where it includes accepting a user selection of a trim sub-profile from a plurality of trim sub-profiles, each sub-profile defining a variant of a relationship between a plurality of vessel speeds and respective trim angles of the propulsion device 10 with respect to the marine vessel 30. As described herein above, the plurality of sub-profiles may include a first sub-profile in which each vessel speed in the plurality of vessel speeds corresponds to a respective trim angle that is less than it would be for a same vessel speed in the selected base profile, and a second sub-profile in which each vessel speed in the plurality of vessel speeds corresponds to a respective trim angle that is greater than it would be for the same vessel speed in the selected base profile. The method may further include adjusting the selected base profile by a multiplier and an offset with the controller 42 to create the variant of the relationship between the plurality of vessel speeds and respective trim angles. The change in trim angle relative to a change in vessel speed may be less in the first sub-profile than in the selected base profile, and the change in trim angle relative to change in vessel speed may be greater in the second sub-profile than in the selected base profile. The vessel speed at which the respective trim angle first becomes non-zero may be greater in the first sub-profile than in the selected base profile, and the vessel speed at which the respective trim angle first becomes non-zero may be less in the second sub-profile than in the selected base profile.

The method may further comprise displaying to the user the selected sub-profile that the controller 42 is using to determine the setpoint trim angle.

The method may also include, as shown at 1006, measuring a speed of the marine vessel. This can be done using any of the above-noted devices and/or methods. The vessel speed is sent to the controller 42. The method may include, as shown at 1008, determining a setpoint trim angle that corresponds to the measured vessel speed according to the selected sub-profile (or selected nominal base profile, as appropriate). As shown at 1010, the method then includes sending a control signal to position the propulsion device 10 at the setpoint trim angle. This may be done using the trim actuator 28.

According to the method, during operation of the marine vessel, the controller 42 will continually determine a setpoint trim angle associated with the measured vessel speed using the selected base profile or sub-profile, and will send control signals to automatically re-position the propulsion device as the measured vessel speed changes. The trim actuator 28 will trim the propulsion device 10 to an appropriate trim angle for the given vessel speed according to the selected base profile or sub-profile.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A trim control system for automatically controlling a trim angle of a trimmable marine propulsion device with respect to a marine vessel, the trim control system comprising:
   a memory that stores a plurality of trim base profiles, each base profile defining a unique relationship between a plurality of vessel speeds and respective trim angles of the propulsion device with respect to the marine vessel, wherein the unique relationship defined by each base profile is one of:
      a calibrated relationship developed by determining optimal trim angles for a particular propulsion device powering a particular marine vessel at a number of tested vessel speeds; and
      developed by modifying a nominal relationship between a number of vessel speeds and a number of corresponding trim angles, wherein the nominal relationship is the calibrated relationship;
   a user interface including an input device that allows a user to select one of the plurality of base profiles from the memory so as to specify an aggressiveness of trim angle relative to vessel speed; and
   a controller that thereafter determines a setpoint trim angle corresponding to a measured vessel speed according to the selected base profile;
   wherein the trim control system thereafter positions the propulsion device at the setpoint trim angle.

2. The trim control system of claim 1, wherein the calibrated relationship is developed by determining the optimal trim angles for the particular propulsion device powering the particular marine vessel at the number of tested vessel speeds and at a number of different conditions, including at least one of under a number of tested loading conditions and with a number of tested propellers.

3. The trim control system of claim 2, wherein the calibrated relationship is defined by a best-fit line for optimal on-plane trim angles for the particular marine vessel plotted with respect to the number of tested vessel speeds.

4. The trim control system of claim 1, wherein:
   the user interface and the input device allow the user to choose whether to further refine the specified aggressiveness by selecting from a plurality of trim sub-profiles, wherein each sub-profile in the plurality of sub-profiles defines a distinct variant of the unique relationship between the plurality of vessel speeds and respective trim angles defined by the selected base profile; and
   the controller thereafter determines the setpoint trim angle corresponding to the measured vessel speed according to the selected sub-profile.

5. The trim control system of claim 4, wherein the plurality of sub-profiles includes:
   a first sub-profile in which each vessel speed in the plurality of vessel speeds corresponds to a respective trim angle that is less than it would be for a same vessel speed in the selected base profile; and
   a second sub-profile in which each vessel speed in the plurality of vessel speeds corresponds to a respective trim angle that is greater than it would be for the same vessel speed in the selected base profile.

6. The trim control system of claim 5, wherein:
   a change in trim angle relative to change in vessel speed is less in the first sub-profile than in the selected base profile; and
   the change in trim angle relative to change in vessel speed is greater in the second sub-profile than in the selected base profile.

7. The trim control system of claim 5, wherein:
   a vessel speed at which the respective trim angle first becomes non-zero is greater in the first sub-profile than in the selected base profile; and
   the vessel speed at which the respective trim angle first becomes non-zero is less in the second sub-profile than in the selected base profile.

8. The trim control system of claim 4, wherein the user interface includes a display that shows the user whether the controller is using the selected base profile or one of the plurality of sub-profiles to determine the setpoint trim angle of the propulsion device.

9. The trim control system of claim 1, wherein the controller receives a signal indicating a type of the propulsion device and thereafter accesses the memory to retrieve a set of base profiles, as appropriate for the type of propulsion device, from which set the user is allowed to select the one of the plurality of base profiles.

10. The trim control system of claim 9, wherein the signal indicates whether the propulsion device is a stern drive or an outboard drive, and the controller accesses the memory to retrieve a set of stern drive base profiles or a set of outboard drive base profiles, as appropriate, from which retrieved set the user is allowed to select the one of the plurality of base profiles.

11. A method for automatically controlling a trim angle of a trimmable marine propulsion device with respect to a marine vessel, the method comprising:
   receiving a signal indicating a type of the propulsion device and thereafter retrieving a set of trim base profiles, as appropriate for the type of propulsion device, each base profile in the set of base profiles defining a unique relationship between a plurality of vessel speeds and respective trim angles of the propulsion device with respect to the marine vessel;
   accepting a user selection of a base profile from the retrieved set of base profiles;
   measuring a speed of the marine vessel;
   with a controller, determining a setpoint trim angle that corresponds to the measured vessel speed according to the selected base profile; and
   sending a control signal to position the propulsion device at the setpoint trim angle.

12. The method of claim 11, wherein the signal indicates that the propulsion device is a particular type of outboard drive, and the method includes retrieving a set of base profiles appropriate for the particular type of outboard drive, from which retrieved set the user selection of the base profile is made.

13. The method of claim 11, wherein the signal indicates that the propulsion device is a stern drive or an outboard drive, and the method includes retrieving a set of stern drive base profiles or a set of outboard drive base profiles, as appropriate, from which retrieved set the user selection of the base profile is made.

14. The method of claim 11, further comprising accepting a user selection of a trim sub-profile from a plurality of trim sub-profiles, each sub-profile in the plurality of sub-profiles defining a variant of the unique relationship between the plurality of vessel speeds and respective trim angles defined by the selected base profile.

15. The method of claim 14, further comprising adjusting the selected base profile by a factor and an offset with the controller to create the variant of the unique relationship between the plurality of vessel speeds and respective trim angles.

16. The method of claim 14, wherein the plurality of sub-profiles includes:
   a first sub-profile in which each vessel speed in the plurality of vessel speeds corresponds to a respective trim angle that is less than it would be for a same vessel speed in the selected base profile; and
   a second sub-profile in which each vessel speed in the plurality of vessel speeds corresponds to a respective trim angle that is greater than it would be for the same vessel speed in the selected base profile.

17. The method of claim 16, wherein:
   a change in trim angle relative to change in vessel speed is less in the first sub-profile than in the selected base profile; and
   the change in trim angle relative to change in vessel speed is greater in the second sub-profile than in the selected base profile.

18. The method of claim 16, wherein:
   a vessel speed at which the respective trim angle first becomes non-zero is greater in the first sub-profile than in the selected base profile; and
   the vessel speed at which the respective trim angle first becomes non-zero is less in the second sub-profile than in the selected base profile.

19. The method of claim 11, wherein the unique relationship defined by each base profile is developed by modifying a nominal relationship between a number of vessel speeds and a number of corresponding trim angles.

20. The method of claim 11, wherein the unique relationship defined by each base profile is a calibrated relationship developed by determining optimal trim angles for a particular propulsion device powering a particular marine vessel at a number of tested vessel speeds.

* * * * *